(12) United States Patent
Heitzler et al.

(10) Patent No.: US 8,820,093 B2
(45) Date of Patent: Sep. 2, 2014

(54) MAGNETOCALORIC HEAT GENERATOR

(75) Inventors: Jean-Claude Heitzler, Horbourg Wihr (FR); Christian Muller, Strasbourg (FR)

(73) Assignee: Cooltech Applications Sociétépar actions simplifée, Holtzheim (FR)

( * ) Notice: Subject to any disclaimer, the term of this patent is extended or adjusted under 35 U.S.C. 154(b) by 188 days.

(21) Appl. No.: 13/147,440

(22) PCT Filed: Feb. 15, 2010

(86) PCT No.: PCT/FR2010/000126
§ 371 (c)(1),
(2), (4) Date: Aug. 2, 2011

(87) PCT Pub. No.: WO2010/094854
PCT Pub. Date: Aug. 26, 2010

(65) Prior Publication Data
US 2011/0289937 A1    Dec. 1, 2011

(30) Foreign Application Priority Data

Feb. 17, 2009  (FR) ...................................... 09 51022

(51) Int. Cl.
*F25B 21/00* (2006.01)
(52) U.S. Cl.
CPC ................ *F25B 21/00* (2013.01); *Y02B 30/66* (2013.01); *F25B 2321/002* (2013.01)
USPC ........................................................... 62/3.1
(58) Field of Classification Search
CPC ....... F25B 1/00; F25B 29/00; F25B 2321/002
USPC ............................... 62/3.1, 3.7, 447; 165/135
See application file for complete search history.

(56) References Cited

U.S. PATENT DOCUMENTS

| | | | | |
|---|---|---|---|---|
| 3,413,814 A | * | 12/1968 | Van Geuns | 62/3.1 |
| 3,991,574 A | * | 11/1976 | Frazier | 60/645 |
| 4,720,978 A | * | 1/1988 | Spacer | 60/641.8 |
| 5,091,361 A | * | 2/1992 | Hed | 505/163 |

(Continued)

FOREIGN PATENT DOCUMENTS

| | | | |
|---|---|---|---|
| WO | 2005/103585 A1 | 11/2005 | |
| WO | WO 2006074790 A1 * | 7/2006 | ............. F25B 21/00 |

*Primary Examiner* — Frantz Jules
*Assistant Examiner* — Emmanuel Duke
(74) *Attorney, Agent, or Firm* — Davis & Bujold, PLLC; Michael J. Bujold

(57) ABSTRACT

The magnetocaloric heat generator (1) comprises at least two magnetocaloric elements (2, 12) arranged in succession and making up at least two consecutive thermal stages crossed by separate heat transfer fluids and comprising each two opposite ends (3 and 4, 13 and 14), a magnetic arrangement intended for subjecting each magnetocaloric element (2, 12) to a variable magnetic field, alternately creating a heating cycle and a cooling cycle in each magnetocaloric element (2, 12), a mechanism (8) for circulating the heat transfer fluids through the magnetocaloric elements alternately towards one end and towards the opposite end and vice versa, in synchronization with the variation of the magnetic field. The magnetocaloric elements (2, 12) are connected thermally two by two at their consecutive ends (4, 13) through the intermediary of a heat exchange mechanism (5) in thermal contact respectively with the heat transfer fluid circulating in the first (2) of the magnetocaloric elements and with the heat transfer fluid circulating in the second (12) of the magnetocaloric elements.

16 Claims, 5 Drawing Sheets

(56) References Cited

U.S. PATENT DOCUMENTS

| | | | |
|---|---|---|---|
| 5,249,424 A * | 10/1993 | DeGregoria et al. | 62/3.1 |
| 5,293,966 A * | 3/1994 | Chareire | 188/72.1 |
| 5,743,095 A * | 4/1998 | Gschneidner et al. | 62/3.1 |
| 6,293,106 B1 * | 9/2001 | Acharya et al. | 62/3.1 |
| 6,453,677 B1 * | 9/2002 | Arman | 62/3.1 |
| 6,502,404 B1 * | 1/2003 | Arman et al. | 62/3.1 |
| 6,595,006 B2 * | 7/2003 | Thiesen et al. | 62/6 |
| 7,481,064 B2 * | 1/2009 | Kitanovski et al. | 62/3.1 |
| 7,650,756 B2 | 1/2010 | Muller et al. | |
| 2007/0125095 A1 * | 6/2007 | Iwasaki et al. | 62/3.1 |
| 2007/0186560 A1 * | 8/2007 | Schauwecker et al. | 62/3.1 |
| 2007/0220901 A1 * | 9/2007 | Kobayashi et al. | 62/3.1 |

* cited by examiner

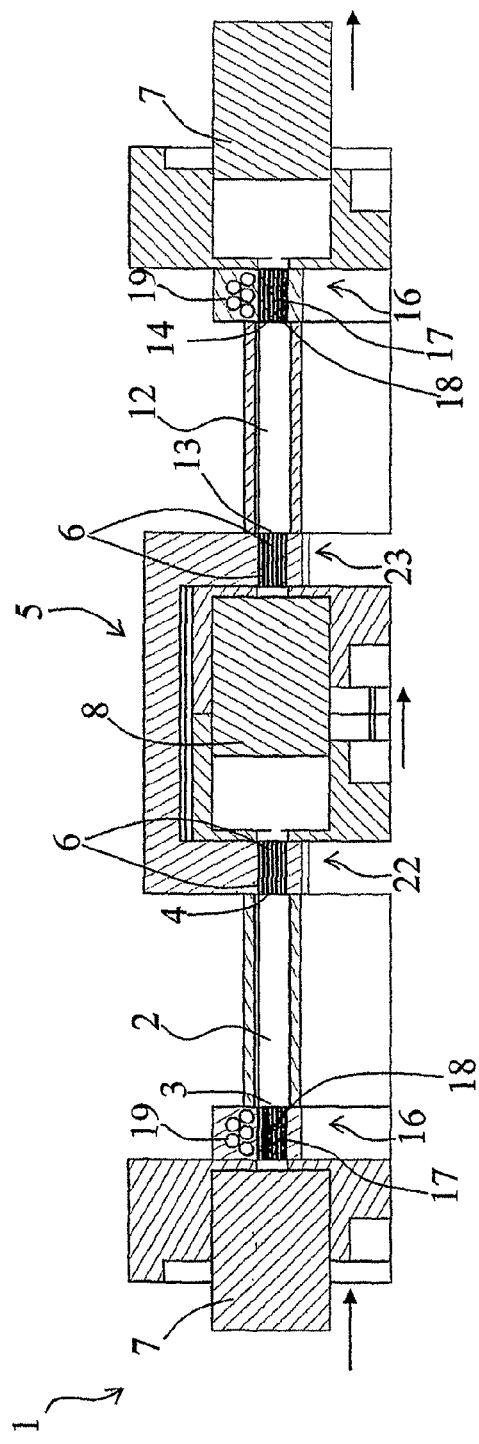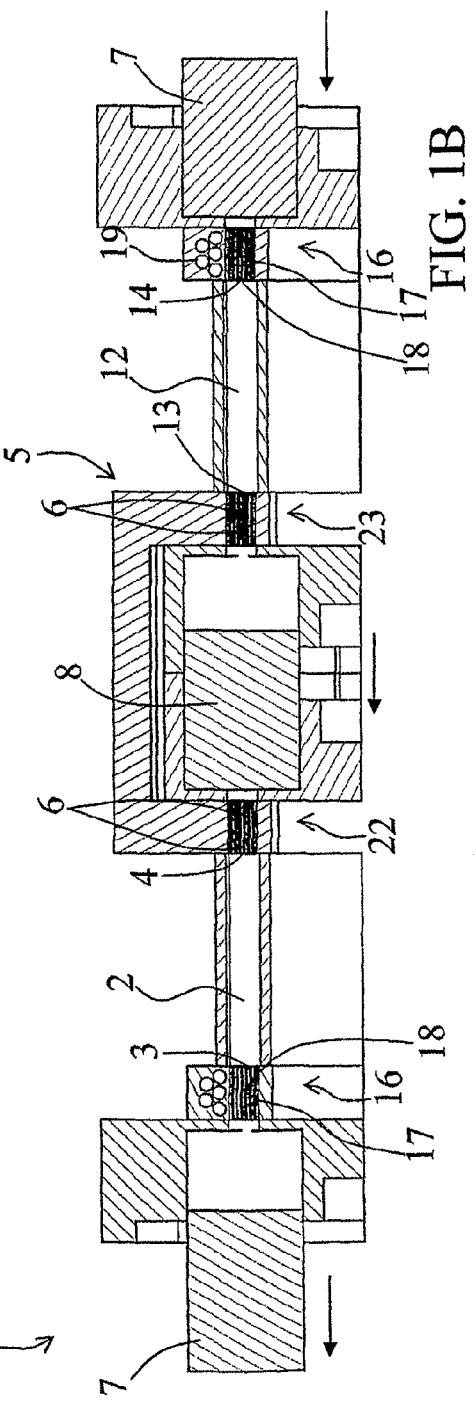

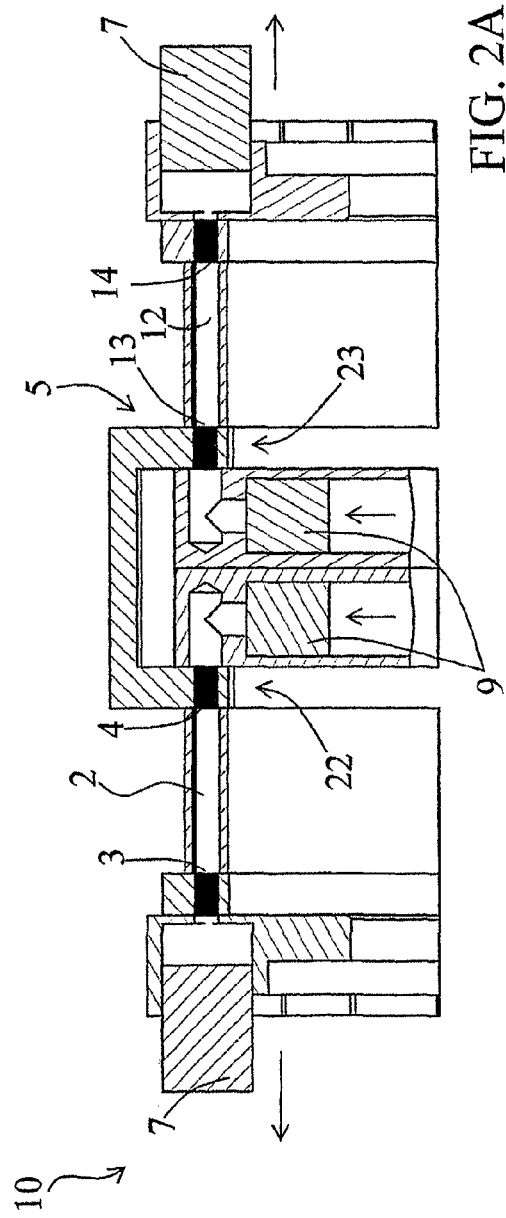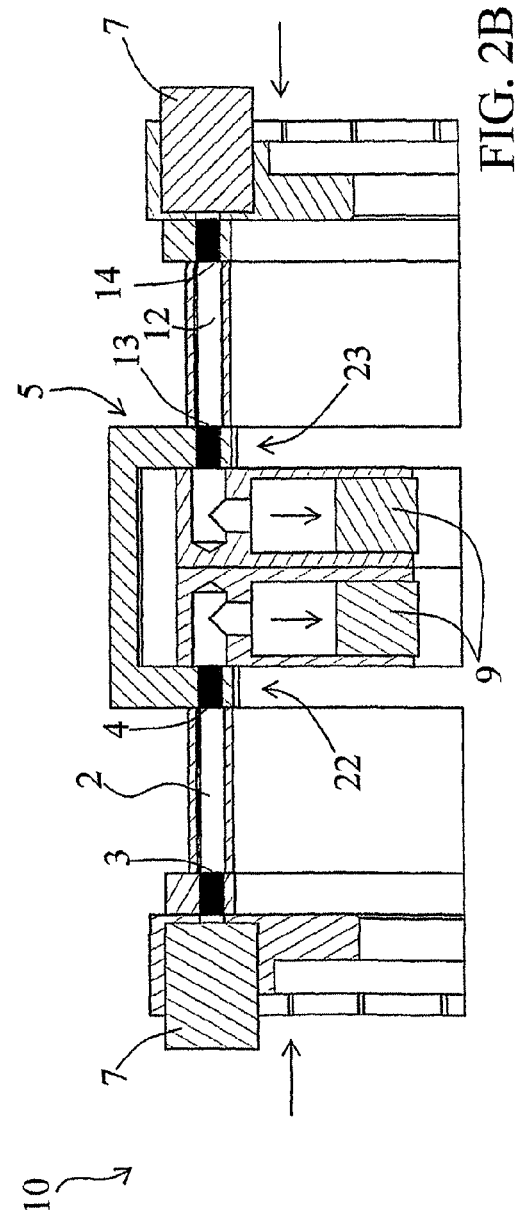

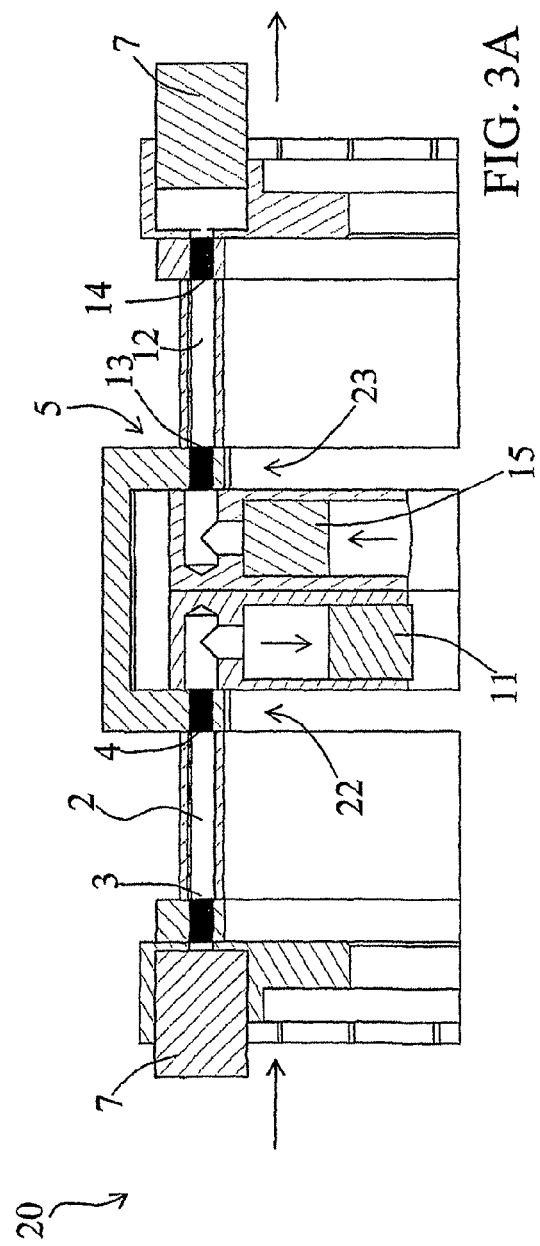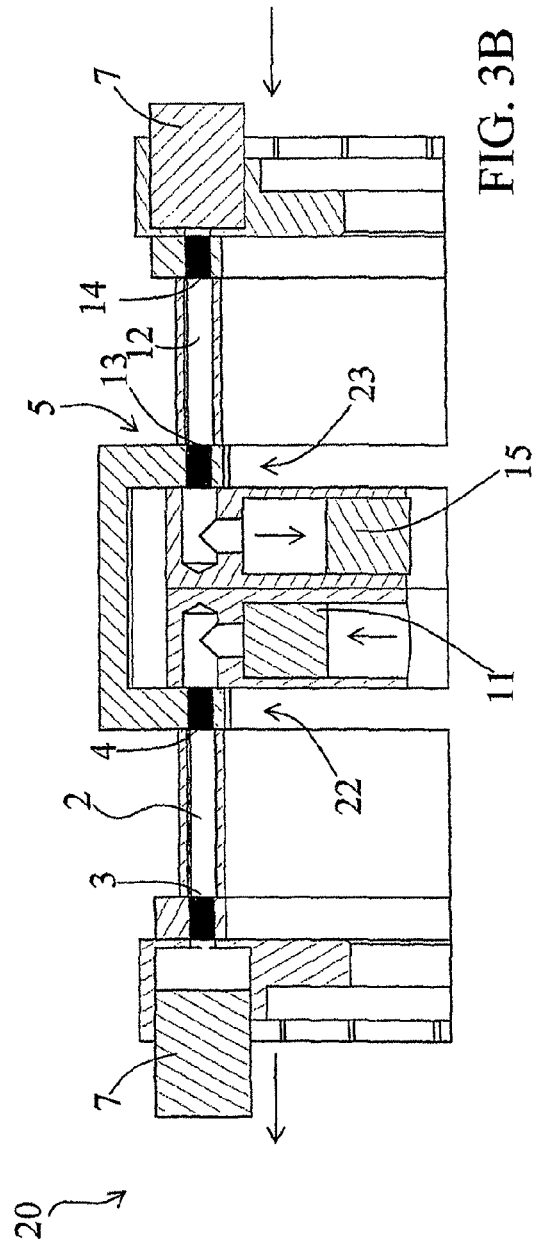

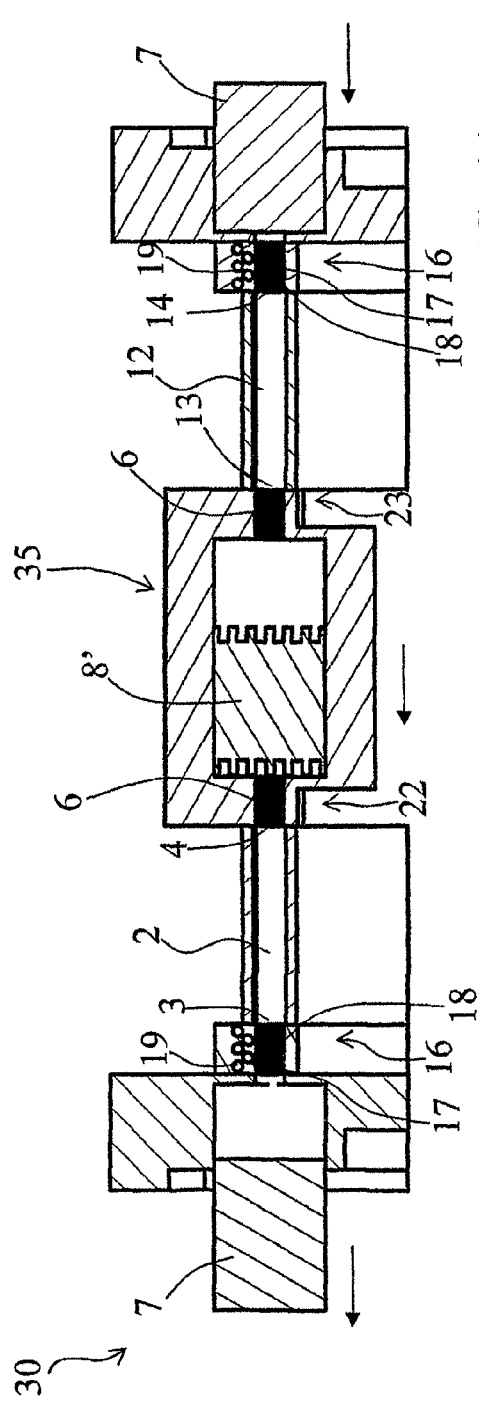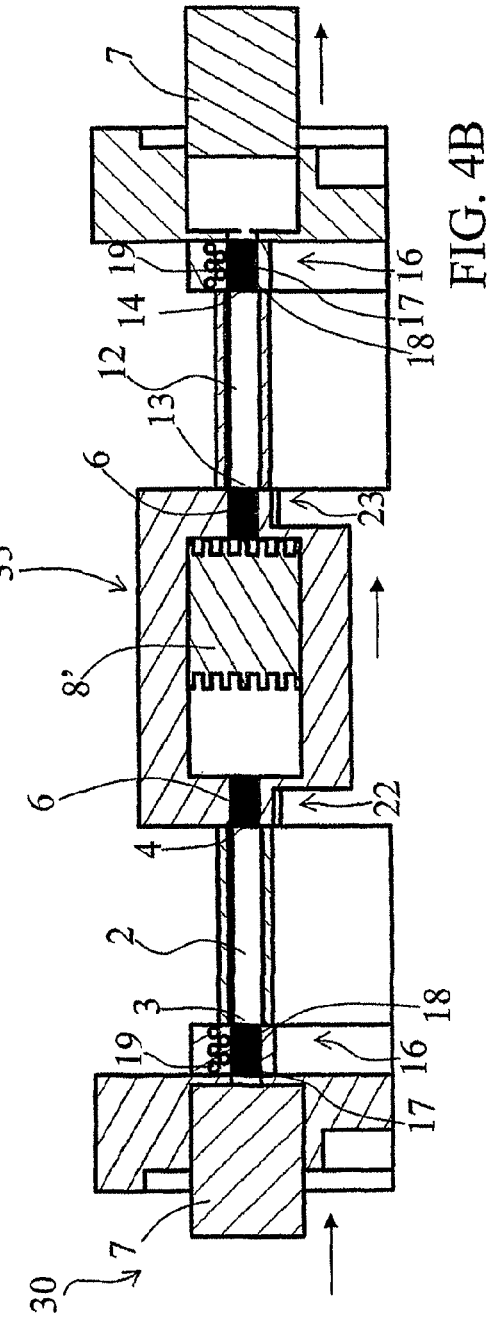

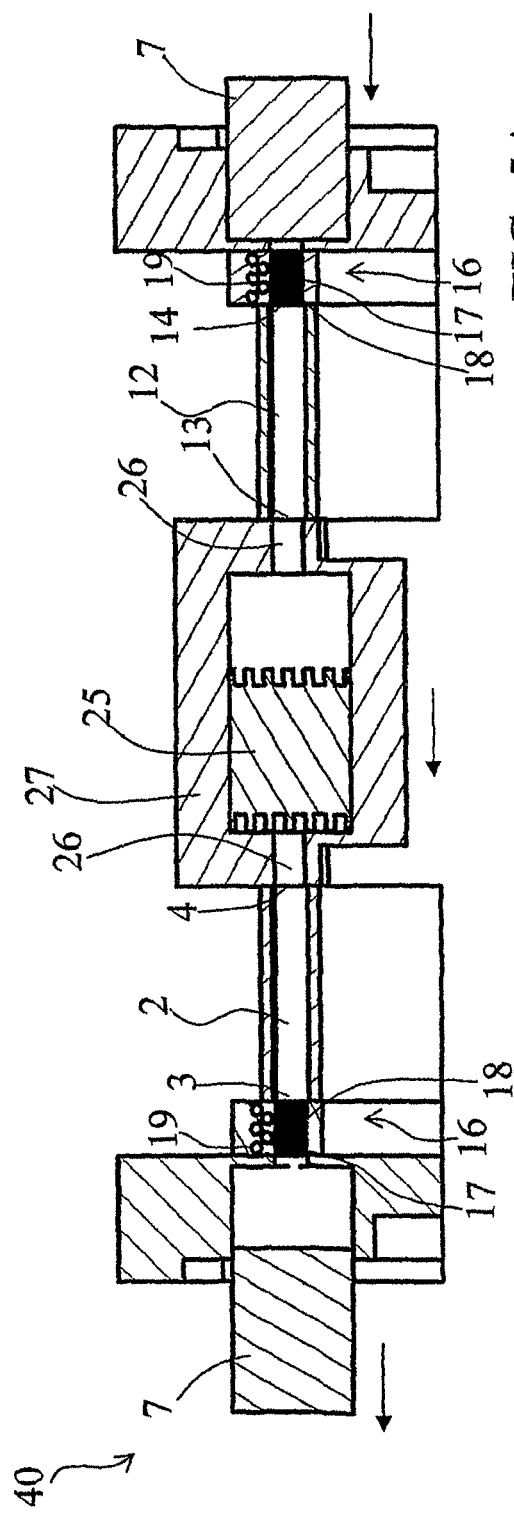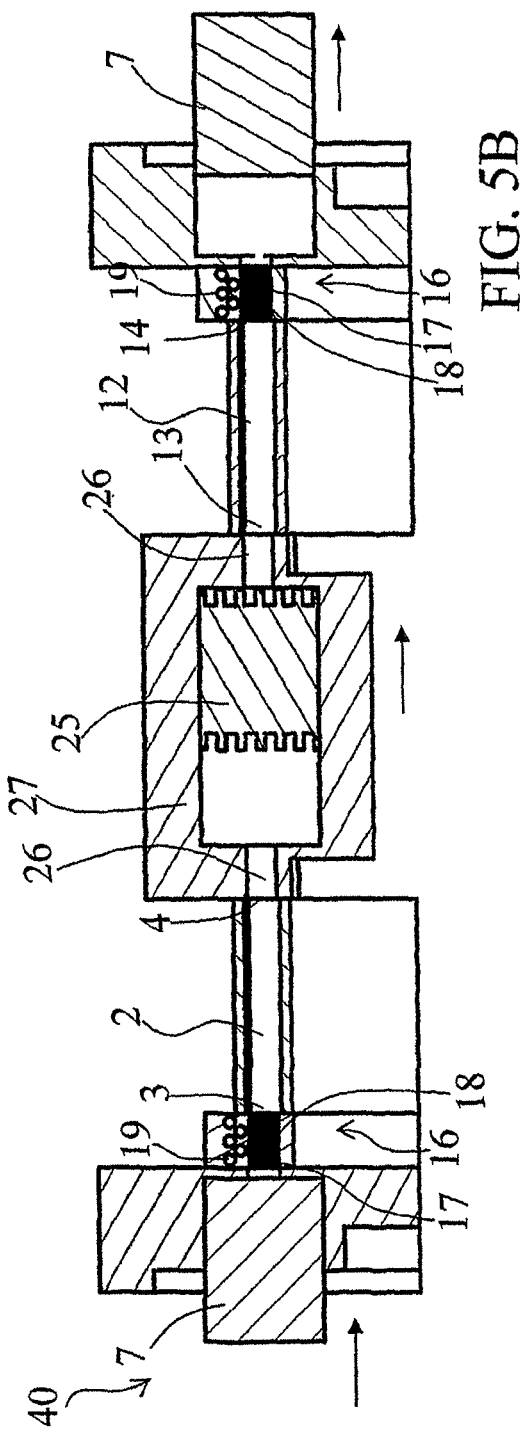

MAGNETOCALORIC HEAT GENERATOR

This application is a National Stage completion of PCT/FR2010/000126 filed Feb. 15, 2010, which claims priority from French patent application serial no. 0951022 filed Feb. 17, 2009.

TECHNICAL SCOPE

The present invention relates to a magnetocaloric heat generator comprising at least two magnetocaloric elements arranged in succession and making up at least two consecutive thermal stages crossed by separate heat transfer fluids and comprising each two opposite ends, a magnetic arrangement intended for subjecting each magnetocaloric element to a variable magnetic field, creating alternately in each magnetocaloric element a heating cycle and a cooling cycle, a means for circulating said heat transfer fluids through said magnetocaloric elements alternately towards one end and towards the opposite end and vice versa, in synchronisation with the variation of the magnetic field.

PRIOR TECHNIQUE

Magnetic refrigeration technology has been known for more than twenty years and the advantages it provides in terms of ecology and sustainable development are widely acknowledged. Its limits in terms of its useful calorific output and its efficiency are also well known. Consequently, all the research undertaken in this field tends to improve the performances of such a generator, by adjusting the various parameters, such as the magnetization power, the performances of the magnetocaloric element, the heat exchange surface between the heat transfer fluid and the magnetocaloric elements, the performances of the heat exchangers, etc.

In order to increase the power of a magnetocaloric generator, it is known to integrate in it several magnetocaloric elements in the form of a stepped structure, so that the fluid exiting one magnetocaloric element is mixed with the fluid entering the following magnetocaloric element to perform a heat exchange and increase the temperature gradient. In such a configuration, the magnetocaloric elements connected fluidically among each other are always in the same magnetic state, that is to say that they are both subjected to a magnetic field or both outside of such a magnetic field, and this alternately.

One knows heat generators having a stepped structure with several thermal modules, each comprising one or several magnetocaloric elements, and whose thermal energy at the outlet of a first thermal module is transferred to the inlet of a second thermal module and so on. This type of generators shows a certain number of disadvantages.

One of the disadvantages lies in the transfer of thermal energy between the outlets and inlets of the successive thermal modules. This transfer is achieved mixing the heat transfer fluids contained in the chambers located at the corresponding ends of said modules, for example. Now, this mixing requires a movement of the fluid and increases necessarily the complexity of the generator and its cost price.

A solution to this disadvantage can consist in using a same circulating means to move the heat transfer fluid in the concerned chambers. Nevertheless, this configuration leads to a disadvantage inherent to the transfer of heat transfer fluid between the thermal modules: passages must be provided to allow the exchange of this fluid, which increases the complexity of the heat generator, does not favor a correct mixing of the heat transfer fluid, does not allow an optimized heat exchange between the fluid exiting one magnetocaloric element and the fluid entering the following thermal module, and favors the increase of head loss.

Furthermore, the use of the known stepped generators leads to an additional difficulty, especially when the used thermal modules are intended for operating in different temperature ranges. In fact, in the case of a stepped structure comprising for example two stages, the magnetocaloric element of one stage may operate in a negative temperature range and the magnetocaloric element of the second stage may operate in a positive temperature range. It is thus necessary to use a suitable heat transfer fluid, whose heat transfer coefficient and viscosity are optimal in both temperature ranges. Now, the heat transfer fluids presently available on the market do not have optimal characteristics on wide temperature ranges, which requires opting for a compromise and does not allow a maximum exploitation of the thermal capacity of the generator.

DESCRIPTION OF THE INVENTION

The present invention aims to overcome these disadvantages by proposing a solution to the problems described above. To that purpose, the magnetocaloric heat generator according to the invention is designed in such a way that its ability to produce thermal power and the transfer of thermal energy between two consecutive thermal modules or magnetocaloric elements of a stepped structure are optimized.

For this purpose, the invention relates to a magnetocaloric heat generator of the kind defined in the preamble, characterized in that said magnetocaloric elements are connected thermally two by two at their consecutive ends through the intermediary of a heat exchange means in thermal contact respectively with the heat transfer fluid circulating in the first of said magnetocaloric elements and with the heat transfer fluid circulating in the second of said magnetocaloric elements.

Advantageously said heat exchange means may comprise two transfer zones connected thermally with each other, forming a thermal bridge. These transfer zones can then be crossed respectively by the heat transfer fluid of each of said magnetocaloric elements.

Preferably, said transfer zones can be arranged contiguously with the corresponding ends of the two consecutive magnetocaloric elements.

In this configuration, the transfer zones can be made out of a heat conducting material such as for example aluminum or copper or their alloys, and they can have through passages for the heat transfer fluid. As a variant, said transfer zones may also be porous, so that the heat transfer fluid can pass through their pores.

In a first variant, the two transfer zones of said heat exchange means may be connected with each other by means of a body out of a heat conducting material.

In a second variant, the two transfer zones of said heat exchange means may be connected with each other by means of at least one heat pipe.

The means for moving the heat transfer fluids can comprise a central actuator in fluidic connection with the consecutive ends of said magnetocaloric elements and two end actuators mounted each in front of one of the free ends of said magnetocaloric elements.

In order to improve the heat exchange between both heat transfer fluids, the central actuator can, in addition, be made out of a heat conducting material and be in contact with said heat exchange means.

As a variant, said central actuator may be a double action piston made out of a heat conducting material and whose liner is made out of a heat insulating material. In this case, said central actuator may make up said heat exchange means.

The means for moving the heat transfer fluids may also comprise two central actuators, each in fluidic connection with one of the consecutive ends of said magnetocaloric elements, and two end actuators, each in fluidic connection with one of the free ends of said magnetocaloric elements.

Advantageously, said means for moving can be pistons chosen among the group comprising single action pistons and double action pistons.

Furthermore, said heat generator can comprise a magnetic arrangement capable of subjecting said successive magnetocaloric elements either constantly in two different cycles, or constantly in the same cycles. The term cycle relates of course to the heating cycle or to the cooling cycle.

Finally, in order to exploit efficiently the thermal capacity of each magnetocaloric element, the heat transfer fluids passing through said magnetocaloric elements can have a different chemical composition and/or different thermal properties. This composition is naturally adapted to every magnetocaloric element, and in particular to its optimum operating temperature centred on its Curie temperature.

BRIEF DESCRIPTION OF THE DRAWINGS

The present invention and its advantages will be better revealed in the following description of several embodiments given as non limiting examples, in reference to the drawings in appendix, in which:

FIGS. 1A and 1B are schematic views of a first embodiment of a heat generator according to the invention, FIGS. 2A and 2B are views similar to these of FIGS. 1A and 1B representing a second embodiment of a heat generator according to the invention, FIGS. 3A and 3B are views similar to these of FIGS. 1A and 1B representing a third embodiment of a heat generator according to the invention, FIGS. 4A and 4B representing an embodiment variant of the heat generator of FIGS. 1A and 1B, and FIGS. 5A and 5B illustrate another embodiment.

ILLUSTRATIONS OF THE INVENTION

In the illustrated embodiment examples, the identical parts or elements have the same numeric references.

The heat generators 1, 10, 20, 30, 40 comprise each two magnetocaloric elements 2, 12 comprising each a magnetocaloric material. The invention is not restricted to this type of configuration and extends to more than two magnetocaloric elements 2, 12, comprising each one or several magnetocaloric materials. In fact, each magnetocaloric element 2, 12 may be made of several magnetocaloric materials having different Curie temperatures and producing a high magnetocaloric effect, so that the juxtaposition of several magnetocaloric materials allows achieving a high temperature gradient between the hot and the cold ends of the heat generator 1, 10, 20, 30, 40 and thus obtaining an even higher efficiency. Such a configuration also allows covering a wide range of temperatures that can correspond to the operating or using range of said generator.

Each magnetocaloric element 2 and 12 comprises two opposite ends, respectively 3 and 4, and 13 and 14. A heat transfer fluid is put in circulation towards one or the other of said opposite ends 3, 4 and 13, 14 of each magnetocaloric element 2, 12, according to the variation of the magnetic field.

Each magnetocaloric element 2, 12 is crossed by a specific heat transfer fluid. The fluidic circuits of the magnetocaloric elements 2, 12 are separated, so that the heat transfer fluids never get mixed.

The used heat transfer fluids may have different or identical compositions. Their composition will be determined in function of the magnetocaloric materials used for producing the magnetocaloric elements 2, 12 and of their operating temperature ranges. They are put in circulation through said magnetocaloric materials 2, 12 towards one or the other of their ends 3 and 4, respectively 13 and 14 in relation with the variation of said magnetic field in order to achieve and maintain a temperature gradient between the two opposite ends 3 et 14 of the heat generator 1, 10, 20, 30, 40.

In order to facilitate the heat exchanges with the heat transfer fluid, the magnetocaloric materials making up the magnetocaloric elements 2, 12 may be porous, so that their pores form open fluid passages. They may also be made in the form of a full block in which mini or micro channels are machined or they may be made up of an assembly of possibly grooved superposed plates, between which the heat transfer fluid can flow. They may also be in the form of powder or particles so that the voids form passages for the fluid. Any other embodiment allowing the heat transfer fluid to pass through said magnetocaloric materials can, of course, be suitable.

The magnetic arrangement (not represented) may be made up of an assembly of permanent magnets put in a relative movement with respect to every magnetocaloric element 2, 12, by an electromagnet powered sequentially or by any other similar means liable to create a magnetic field variation.

In the heat generator 1 represented in FIGS. 1A and 1B, the magnetocaloric elements 2, 12 are aligned and form two consecutive thermal stages. They are always both subjected to the same magnetic field variation and are either in a heating cycle or in a cooling cycle. So, in FIG. 1A, the magnetocaloric elements 2 and 12 are magnetically activated so that they heat up. The heat transfer fluid is put in circulation towards the right in FIG. 1A, in the direction of the represented arrows. In FIG. 1B, the magnetocaloric elements 2 and 12 are magnetically de-activated so that they cool down. The heat transfer fluid is put in circulation towards the left in FIG. 1B, in the direction of the represented arrows.

The magnetocaloric elements 2 and 12 are connected thermally by a heat exchange means 5 made of a U-shaped part made in a heat conducting material and fitted at the ends of its legs with two transfer zones 22 and 23. Each transfer zone 22, 23 comprises through passages 6 allowing the circulation of heat transfer fluid. These two transfer zones 22 and 23 are arranged in the heat generator 1, contiguously to the consecutive ends 4 and 13 of the two magnetocaloric elements 2, 12. These transfer zones 22 and 23 are thus in direct contact with said magnetocaloric elements 2, 12.

The means for circulating the heat transfer fluids comprises on the one hand two aligned pistons 7 forming the end actuators, mounted each in front of the free end 3, 14 of said magnetocaloric elements 2, 12, these pistons 7 moving simultaneously in the same direction to impart a reciprocating movement to both heat transfer fluids and, on the other hand, a double-action piston 8 forming the central actuator and housed in the exchange means 5, aligned with the two other pistons 7, in fluidic connection with the consecutive ends 3, 14 of said magnetocaloric elements 2, 12 and moving in the same direction as the two other pistons 7. These pistons 7, 8 are driven by any known means such as a control cam, a variable magnetic field, a fluidic system or any other similar means.

This double action piston 8 is integrated between the two magnetocaloric elements 2 and 12 and allows distributing the thrust required to move the heat transfer fluids among the various actuators or pistons, and thus compensating better the head losses.

In addition, this double action piston 8 separates the volumes in which the various magnetocaloric elements 2, 12 are arranged. This configuration allows using different heat transfer fluids adapted to every type of magnetocaloric element, and thus to its operating temperature. The fact of using different fluids allows selecting the latter so that their heat transfer coefficient and their viscosity are adapted to the temperature around which they are used, and thus using the maximum of the heat capacity of each magnetocaloric element 2, 12.

So, during the cycle in which the magnetocaloric elements 2, 12 are magnetically activated (see FIG. 1A), the heat transfer fluid associated to the first magnetocaloric element 2 is put in circulation by piston 7 in the first magnetocaloric element 2, heats up and then passes through the corresponding transfer zone 22 of the heat exchange means 5 to arrive in the liner of double action piston 8. Simultaneously, the heat transfer fluid associated to the second magnetocaloric element 12 exits the chamber of double action piston 8, passes through the other transfer zone 23 of the heat exchange means 5, circulates in the second magnetocaloric element 12 towards piston 7 and heats up. So, the thermal energy of the heat transfer fluid associated to the first magnetocaloric element 2, hereafter called the first heat transfer fluid, is absorbed by the heat exchange means 5 through the transfer zone 22, and is returned to the heat transfer fluid associated to the second magnetocaloric element 12, hereafter called the second heat transfer fluid, through the transfer zone 23. The thermal energy transfer is achieved almost simultaneously, by heat conduction, between, on the one hand, the first heat transfer fluid and the heat exchange means 5 and, on the other hand, between said heat exchange means 5 and the second heat transfer fluid.

During the cycle represented in FIG. 1B, in which the magnetocaloric elements 2, 12 are magnetically de-activated, the heat transfer fluids circulate from right towards left while the two magnetocaloric elements 2, 12 cool down. The second heat transfer fluid carries out a heat exchange with the corresponding transfer zone 23 of the heat exchange means 5 which, in turn, carries out a heat exchange with the first heat transfer fluid, at the corresponding transfer zone 22 of the heat exchange means 5.

In this heat generator 1, the two magnetocaloric elements 2, 12 comprise different magnetocaloric materials, the Curie temperature of the first magnetocaloric element 2 being lower than that of the second magnetocaloric element 12, so that the first magnetocaloric element 2 can for example be active in a negative temperature range and the second magnetocaloric element 12 is active in a positive temperature range. Such a configuration allows widening the operating range of the heat generator 1.

Of course, the invention also provides the possibility of using magnetocaloric elements 2, 12 comprising the same magnetocaloric materials.

The heat exchange means 5 connecting two consecutive magnetocaloric elements 2, 12 in a stepped structure thus allows transferring the thermal energy from one stage to the other without fluid transfer and contributes to increasing the temperature gradient from one stage to the other and, consequently, the temperature gradient between the cold end 3 and the hot end 14 of the heat generator 1.

The heat generator 1 comprises moreover, at its opposite ends 3 and 14 made up by the free ends of the magnetocaloric elements 2 and 12, an exchange means 16 that allows achieving a thermal energy exchange with an external device or application. These external applications can be the air surrounding the heat generator, a thermal device or enclosure, for example.

These exchange means 16 also comprise a transfer zone 17 made in a heat conducting material provided with through passages 18 for the heat transfer fluid and contiguous to the free ends 3, 14 of the magnetocaloric elements 2, 12, so that the heat transfer fluid passes through said transfer zone 17 every time it enters and exits the magnetocaloric element 2, 12. This transfer zone 17 thus allows exchanging thermal energy with the heat transfer fluid at every cycle and thus constitutes a very efficient heat exchanger. Moreover, this transfer zone 17 is connected thermally with an external application via a closed circuit provided with channels 19 integrated in said exchange means 16 and in which a heat transfer fluid associated with the external application circulates.

Of course, the invention is not restricted to this type of heat exchanger, any other suitable exchanger can be used.

In the heat generator 10 represented in FIGS. 2A and 2B, the magnetocaloric elements 2, 12 are aligned, consecutive and always in a different heating or cooling cycle. So, in FIG. 2A, the magnetocaloric element 2 located on the left or first magnetocaloric element 2 is magnetically de-activated and the magnetocaloric element 12 located on the right or second magnetocaloric element 12 is magnetically activated. The heat transfer fluid is put in circulation towards the left in the first magnetocaloric element 2 and towards the right in the second magnetocaloric element 12, in the direction of the represented arrows. In FIG. 2B, the magnetocaloric elements 2 and 12 are in the opposite magnetic state and the heat transfer fluid is put in circulation towards the right in the first magnetocaloric element 2 and towards the left in the second magnetocaloric element 12.

The heat exchange means 5 is the same as that represented in FIGS. 1A and 1B. It also allows achieving a heat exchange between the two heat transfer fluids circulating in the consecutive magnetocaloric elements 2 and 12. In this embodiment, the heat transfer fluids are put in circulation, on the one hand, at the free ends 3 and 14 of the magnetocaloric elements 2 and 12, by two aligned pistons 7, identical to those mounted in the heat generator 1 of FIGS. 1A and 1B, but moving simultaneously in two opposite directions. Likewise, the movement of the heat transfer fluids at the consecutive ends 4 and 13 of the two magnetocaloric elements 2 and 12 is achieved by two distinct single action pistons 9, forming the central actuators and pushing each a heat transfer fluid in one of the magnetocaloric elements 2, 12.

The transfer zones 22 and 23 of the heat transfer means 5 are arranged in the passage of the heat transfer fluid, between the end 4, 13 of a magnetocaloric element 2, 12 and its single action piston 9, and they are thus crossed simultaneously by the heat transfer fluids every time they enter and they exit the magnetocaloric elements 2, 12.

In the heat generator 20 illustrated in FIGS. 3A and 3B, the fluid circulates the same way as in the heat generator 1 of FIGS. 1A and 1B. However, its operation is different. The double-action piston 8 is replaced with two single action pistons 11, 15, each in fluidic connection with one of the magnetocaloric elements 2, 12. This way, when a piston 11 or 15 forming a central actuator sucks the heat transfer fluid of the corresponding magnetocaloric element 2 or 12, the other piston 15 or 11 pushes the heat transfer fluid in the corresponding magnetocaloric element 12 or 2, and vice-versa.

In this configuration, the transfer zones 22 and 23 of the heat exchange means 5 are also arranged in the passage of the heat transfer fluid, between an end 4, 13 of a magnetocaloric element 2, 12 and a single action piston 11, 15, contiguously to said end 4, 13. They are thus crossed simultaneously by the heat transfer fluids at every magnetic cycle: on the one hand every time the first heat transfer fluid exits the magnetocaloric element 2 and the second heat transfer fluid enters the magnetocaloric element 12 (see FIG. 3A) and, on the other hand, every time the first heat transfer fluid enters the magnetocaloric element 2 and the second heat transfer fluid exits the magnetocaloric element 12 (see FIG. 3B).

The heat generator 30 represented in FIGS. 4A and 4B is a variant of the embodiment of FIGS. 1A and 1B, in which the central piston 8' is made out of a heat conducting material and whose liner is formed in the heat exchange means 35. This way, the thermal energy of the heat transfer fluids circulating in the two adjacent magnetocaloric elements 2, 12 is exchanged both by the transfer zones 22 and 23 of the heat exchange means 35 and by the central piston 8'. This central piston 8' allows achieving a heat exchange on the one hand directly between the two heat exchange fluids with which it is in contact and, on the other hand, with the heat exchange means 35, which achieves a heat exchange with said heat transfer fluids. Such a configuration allows improving further the heat exchange between both heat transfer fluids.

In a non represented variant, which is liable to be combined in any of the embodiments illustrated in FIGS. 1A, 1B, 2A, 2B, 3A, 3B and 4A, and 4B, the two transfer zones 22 and 23 of the exchange means 5, 35 may be connected with each other by at least one heat pipe so as to ensure the thermal energy exchange among them.

FIGS. 5A and 5B represent an embodiment of the heat generator 40 whose structure is approximately identical to that of the heat generator 30 of FIGS. 4A and 4B and in which the heat exchange means 25 is formed by the central actuator located between two successive magnetocaloric elements 2, 12. This central actuator 25 is a double action piston made in a heat conducting material and whose liner 27 is made out of a heat insulating material. This liner 27 has the same shape as that of the heat exchange means 35 of the heat generator 30 of FIGS. 4A and 4B, but it differs from it by its material, which is a heat insulator, and by the absence of transfer zones, which are replaced with two passage zones 26 for a heat transfer fluid. In this configuration, the thermal energy exchange between the two heat transfer fluids is achieved via said central piston or double action piston 25 in contact with these two heat transfer fluids.

To improve further the exchange capacity, the central pistons 8', 25 of FIGS. 4A, 4B, 5A and 5B may comprise fins on their work sides in contact with a heat transfer fluid.

In all of the heat generators 1, 10, 20, 30, 40 represented, an exchange means 16 is every time integrated in the cold 3 and hot 14 ends of said generators. The invention is however not restricted to this type of configuration and also extends to embodiments in which only one of said cold 3 or hot 14 end is in contact with such an exchange means 16 and/or said heat exchange means 5, 35 is thermally connected with an external device or application.

Moreover, the invention is not restricted neither to heat generators comprising only two stages of consecutive magnetocaloric elements 2, 12. It may be extended to more than two stages of consecutive magnetocaloric elements, while each stage may comprise several adjacent magnetocaloric elements.

Finally, the invention is not restricted to the use of pistons to form the actuators intended to move the heat transfer fluids. Other types of actuators may be considered, such as for example membranes.

POSSIBILITIES FOR INDUSTRIAL APPLICATION

This description shows clearly that the invention allows reaching the goals defined, that is to say to offer a heat generator 1, 10, 20, 30, 40 with a simple construction in which the transfer of the thermal energy between the various stages of constituent magnetocaloric elements 2, 12 is simplified and implemented efficiently.

Such a heat generator 1, 10, 20, 30, 40 can find an application, as well industrial as domestic, in the area of heating, air conditioning, tempering, cooling or others, at competitive costs and with reduced space requirements.

The present invention is not restricted to the examples of embodiment described, but extends to any modification or variant which is obvious to a person skilled in the art while remaining within the scope of the protection defined in the attached claims.

The invention claimed is:

1. A magnetocaloric heat generator comprising:
    at least two magnetocaloric elements (2, 12) arranged in succession and making up at least two consecutive thermal stages crossed by separate heat transfer fluids and each comprising two opposite ends (3 and 4, 13 and 14),
    a magnetic arrangement intended for subjecting each magnetocaloric element (2, 12) to a variable magnetic field thereby alternately creating a heating cycle and a cooling cycle in each magnetocaloric element (2, 12),
    a means (7, 8, 8', 9, 11, 15, 25) for circulating the heat transfer fluids through the magnetocaloric elements alternately towards one end of the magnetocaloric heat generator and towards the opposite end of the magnetocaloric heat generator, and vice versa, in synchronisation with a variation of the magnetic field;
    wherein the magnetocaloric elements (2, 12) are connected thermally two by two at consecutive ends (4, 13) thereof through an intermediary of a heat exchange means (5, 25, 35) in thermal contact respectively with the heat transfer fluid circulating in the first (2) of the magnetocaloric elements and with the heat transfer fluid circulating in the second (12) of the magnetocaloric elements.

2. The heat generator according to claim 1, wherein the heat exchange means (5, 35) comprises two transfer zones (22, 23) thermally connected with each other and crossed respectively by the heat transfer fluid of each of the magnetocaloric elements (2, 12).

3. The heat generator according to claim 2, wherein the transfer zones (22, 23) are arranged contiguously with corresponding ends (4, 13) of the consecutive two magnetocaloric elements (2, 12).

4. The heat generator according to claim 3, wherein the transfer zones (22, 23) are manufactured from a heat conducting material and have through passages (6) for the heat transfer fluid.

5. The heat generator according to claim 2, wherein the two transfer zones (22, 23) of the heat exchange means (5, 35) are connected with each other by a body which comprises a heat conducting material.

6. The heat generator according to claim 1, wherein the means for circulating the heat transfer fluids comprises two central actuators (9; 11 and 15), each in fluidic connection with one of the consecutive ends (4, 13) of the magnetocaloric elements (2, 12), and two end actuators (7), each in fluidic connection with one free end (3, 14) of the magnetocaloric elements (2, 12).

7. The heat generator according to claim 6, wherein the heat generator comprises a magnetic arrangement capable of constantly subjecting the successive magnetocaloric elements (2, 12) in two different cycles.

8. The heat generator according to claim 1, wherein the heat transfer fluids passing through the magnetocaloric elements (2, 12) have at least one of different chemical composition and different thermal properties.

9. A magnetocaloric heat generator comprising: at least first and second magnetocaloric elements (2, 12) arranged in succession and forming at least two consecutive thermal stages crossed by separate heat transfer fluids and each comprising two opposite ends (3 and 4, 13 and 14), a magnetic arrangement intended for subjecting each of the first and the second magnetocaloric elements (2, 12) to a variable magnetic field thereby alternately creating a heating cycle and a cooling cycle in each of the at least the first and the second magnetocaloric elements (2, 12), a central actuator (8, 8', 25), in fluidic connection with a first of the two opposite ends (4, 13) of each of the at least first and second magnetocaloric elements (2, 12), and first and second end actuators (7), with the first end actuator mounted to a second of the two opposite ends (3, 14) of the first magnetocaloric element (2) and the second end actuator mounted to a second of the two opposite ends (3, 14) of the second magnetocaloric element (12), for circulating the heat transfer fluids through the at least first and second magnetocaloric elements alternately towards one end of the magnetocaloric heat generator and then towards the opposite end of the magnetocaloric heat generator, and vice versa, in synchronisation with a variation of the magnetic field; wherein the at least first and second magnetocaloric elements (2, 12) are thermally connected two by two at the first opposite ends (4, 13) thereof via an intermediary of a heat exchanger (5, 25, 35) in thermal contact respectively with the heat transfer fluid circulating in the first (2) of the magnetocaloric elements and with the heat transfer fluid circulating in the second (12) of the magnetocaloric elements.

10. The heat generator according to claim 9, wherein the central actuator (25) is manufactured from a heat conducting material and is in contact with the heat exchange means (5).

11. The heat generator according to claim 9, wherein the central actuator (8') is a double action piston which comprises a heat conducting material and whose liner is manufactured from a heat insulating material, and the central actuator (8') makes up the heat exchange means.

12. The heat generator according to claim 9, wherein the means for circulating (7, 9, 11, 15, 8, 8', 25) are pistons selected from the group consisting of single action pistons (7, 9, 11, 15) and double action pistons (8, 8', 25).

13. The heat generator according to claim 9, wherein the heat generator comprises a magnetic arrangement capable of constantly subjecting the successive magnetocaloric elements (2, 12) in the same cycles.

14. A magnetocaloric heat generator comprising;
at least first and second magnetocaloric elements (2, 12) arranged in succession and comprising at least first and second consecutive thermal stages being crossed by separate heat transfer fluids,
each of the first and the second magnetocaloric elements comprising two opposed ends (3 and 4, 13 and 14),
a first fluid pathway passing through the first magnetocaloric element (2) having first and second terminal ends,
a separate second fluid pathway passing through the second magnetocaloric element (12) having first and second terminal ends,
the first fluid pathway and the second fluid pathway always remaining separate from one another so that the fluid, in the first fluid pathway, and the fluid in the second fluid pathway, never mix with one another,
a magnetic arrangement subjecting each of the first and the second magnetocaloric elements (2, 12) to a variable magnetic field for alternately creating a heating cycle and a cooling cycle in each of the first and the second magnetocaloric elements (2, 12),
at least one actuator (7, 8, 8', 9, 11, 15, 25) coupled to at least one fluid pathway, the at least one actuator (7, 8, 8', 9, 11, 15, 25) causing a reciprocating movement of both the heat transfer fluid in the first fluid pathway through the first magnetocaloric element and the heat transfer fluid in the second fluid pathway through the second magnetocaloric element, alternately towards one terminal end and then towards the opposite other terminal end in each fluid pathway, and the reciprocating movement moving in synchronisation with a variation of the magnetic field,
the first and the second magnetocaloric elements (2, 12) being thermally connected, two by two, at adjacent ends (4, 13) via an intermediary of a heat exchanger (5, 25, 35), and
the heat exchanger being in thermal contact respectively with the heat transfer fluid flowing through the first magnetocaloric element (2) and with the heat transfer fluid flowing through the second magnetocaloric element (12).

15. The heat generator according to claim 14 wherein the actuator is one of a membrane and a piston.

16. The heat generator according to claim 14 wherein each of the first and the second terminal ends is defined by a face of the actuator.

* * * * *